United States Patent Office 3,579,661
Patented May 25, 1971

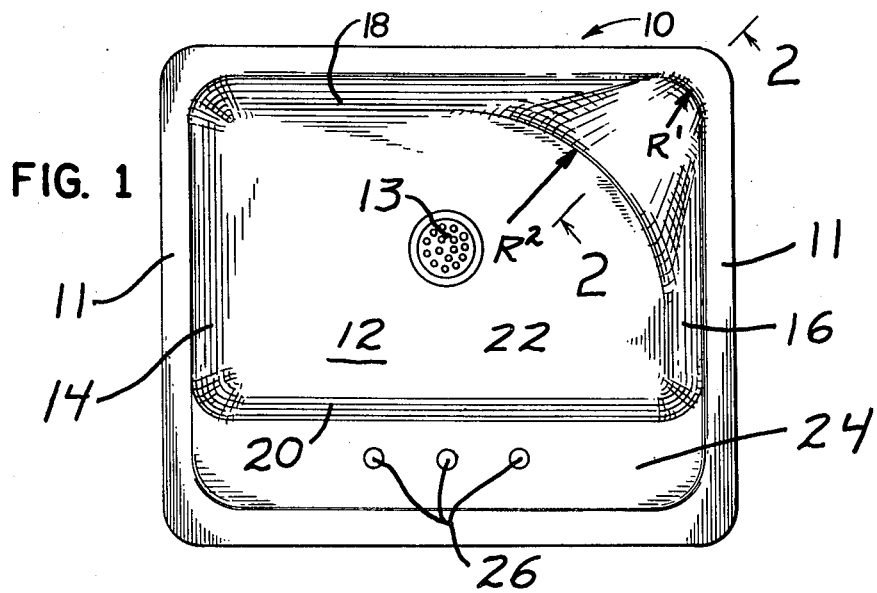
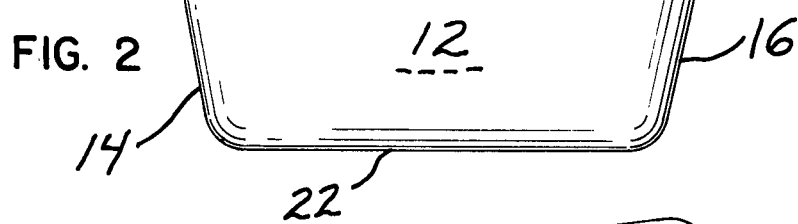
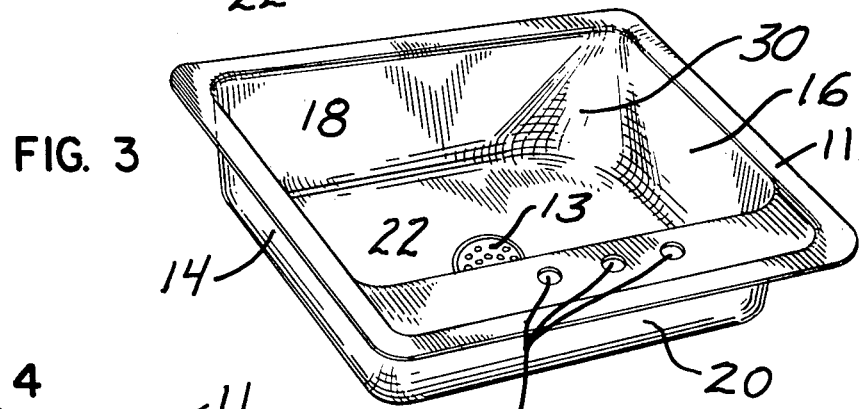
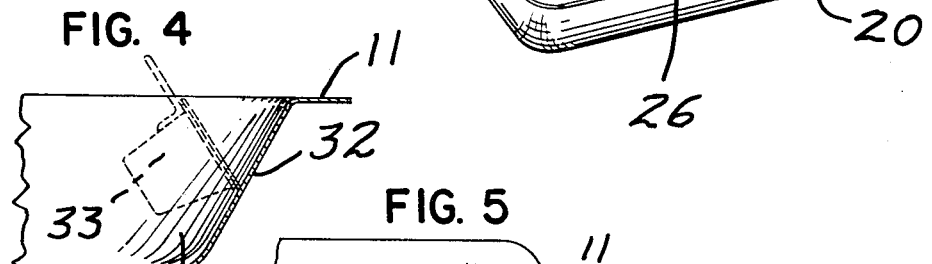
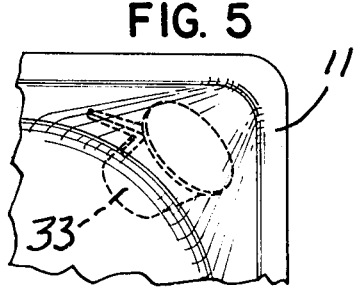

3,579,661
SINK
Millard H. Lien, Omaha, Nebr., assignor to
Crane Co., Chicago, Ill.
Filed May 6, 1969, Ser. No. 822,152
Int. Cl. E03c 1/18
U.S. Cl. 4—187                              2 Claims

ABSTRACT OF THE DISCLOSURE

A plumbing fixture, such as a kitchen sink, wherein at least one corner has a radius of curvature which progressively increases from the top portion of the sink to the bottom portion. Such variation in radii enables the draining of kitchen utensils, such as pots or pans, which are of different diameter, by moving the utensil to the appropriate position along the sink corner which substantially conforms to the curvature of the utensil.

BACKGROUND AND SUMMARY OF THE INVENTION

The present invention relates to a novel plumbing fixture, and in particular, to a sink structure.

Kitchen sinks, although in use for hundreds of years, have changed very little with respect to improving their utility. Although design improvements have altered the appearance of sinks, fixtures, and mountings, the sink and its functional limitations, has remained substantially unchanged.

One of the common uses of a sink is for draining cooked foods, such as vegetables. Heretofore, this has been accomplished by the use of a strainer, or colander, which is usually placed in the sink and the entire contents of the utensil or container are emptied into the strainer or colander. Or, the cover on the container may be slightly displaced with respect to the container and the same tilted until the water is drained therefrom. This procedure often results in accidental spillage of the contents.

The instant invention presents a solution to the above and also an elimination for such mentioned accessories used to drain containers.

In accordance with the invention, at least one corner of the sink is provided with a novel structure, which is integral with the sink, which permits the convenient draining of utensils, such as pots or pans, regardless of their diameter by utilizing the corner of the sink to assist in such draining.

It is, therefore, the primary object of my invention to provide an improved sink structure which enables the draining of various diameter utensils against the corner thereof.

EXEMPLARY EMBODIMENTS

Other objects, features and advantages will be fully understood as the description proceeds, which when taken with the accompanying drawings, illustrates the preferred embodiment, and wherein:

FIG. 1 is a plan view of a sink showing the improved portion in the upper right-hand corner;

FIG. 2 is a front elevational view of FIG. 1;

FIG. 3 is a perspective view of the sink showing the improved corner;

FIG. 4 is a partial sectional view taken substantially along lines 2—2 of FIG. 1 showing a utensil being drained: and, FIG. 5 is a partial plan view of the upper right-hand corner of FIG. 1 showing a utensil being drained.

As shown in FIGS. 1-3, a plumbing fixture, such as a sink 10 includes a basin 12 which is formed by side walls 14, 16; front wall 18; and back wall 20, all of which are integral with and project upwardly from bottom 22 to form the continuous basin 12. An outlet 13 is placed in substantially the center of the basin 12 to permit drainage of liquid therefrom.

A fitting ledge 24, projecting substantially perpendicular from the back wall 20 has openings 26 therein to accommodate the usual pipe fittings necessary to attach the conventional hot and cold water valves (not shown) to the sink to enable regulation of the water volume and temperature into basin 12.

A marginal horizontal flange 11 projects from sides 14, 16; front wall 18; and fitting ledge 24 to support the sink 10 when it is placed in a cutout portion of a countertop (not shown) so that the flange 11 supports the sink 10 in the usual manner.

As best shown in FIGS. 1 and 4, the improvement consists of a novel corner 30 of the sink 10 whereby the edge 32 slopes inwardly toward the center of the sink, and, the radius of curvature of the said corner increases from the top portion of the sink, as indicated by $r^1$ to a substantially larger radius at the bottom, as indicated by $r^2$. Thus, the radius gradually increasing from $R^1$ to $R^2$ as one progresses along the corner 30 of the sink from the flange 11 toward to bottom 22.

It is apparent that the novel corner structure provides an improvement which contributes to the utility of a sink. By merely positioning a utensil 33 along the corner 30 of the sink to the place where the corner radius coincides with the diameter of the utensil 33 being drained and tipping the said utensil, as shown in FIG. 4 or 5, spillage of the contents is prevented and the fluid therein may be conveniently poured from the utensil.

The novel construction thus affords the convenience of enabling the draining of utensils of various sizes by merely positioning the utensil along the corner of the sink to the radius which corresponds substantially to the diameter of the utensil. With reference to FIG. 5, the utensil 33 is positioned and tilted to permit the draining thereof at a position along the corner 30 whereby the radii of curvature of the corner of the sink 12 and the diameter of the said utensil substantially coincide. Thus, the novel construction, which is integral with the sink structure, eliminates the necessity for any additional drainage and straining attachments for most purposes.

Although the exemplary embodiments shown in FIGS. 1 thru 5 disclose a common type of sink structure whereby only one corner of the sink utilizes the improved drainage feature, it is understood that such feature could be incorporated in sinks of other designs and could also be incorporated in more than one corner thereof. Also, the novel corner structure could be utilized in either a cast iron, sheet metal, or plastic sink since the article could be either cast, drawn, or formed, respectively, in a conventional manner.

Although the present invention has been described in conjunction with a simplified control type of sink, it is understood that modifications and variations may be resorted to without departing from the spirit and scope of the invention. Such modifications and variations are considered to be well within the purview and scope of the invention and the claims.

I claim:
1. A plumbing fixture including:
   (a) a basin having a plurality of walls, said walls forming a plurality of corners;
   (b) a bottom integral with said walls, said bottom having a centrally positioned outlet;
   (c) at least one of said corners having a radius of curvature blending into its adjacent walls, said radius progressively increasing from the top of said basin to said bottom, said one corner forming a straight wall in vertical section, said wall slanting toward said outlet to thereby enable utensils of various diam-